M. McMILLIAN.
Cotton-Seed Planter.
No. 97,424.
Patented Nov. 30, 1869.
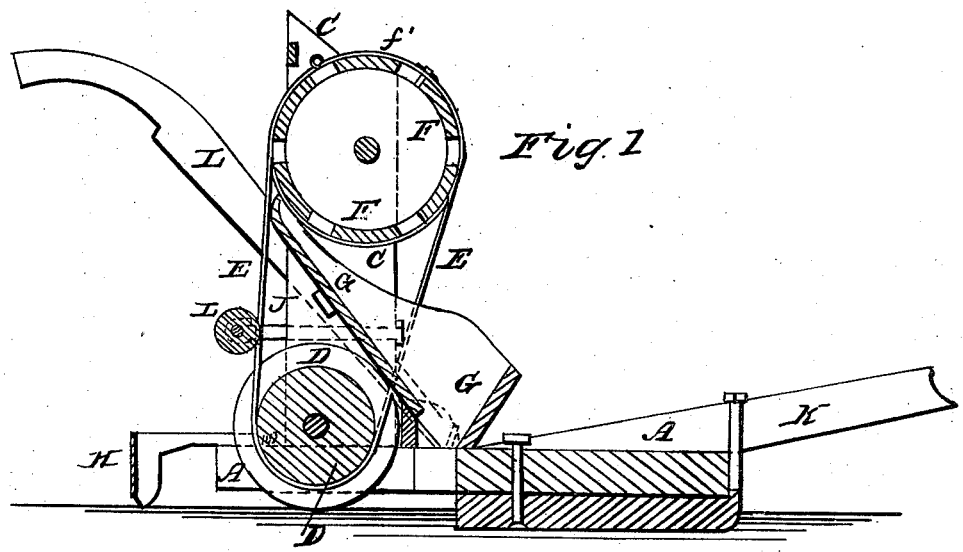
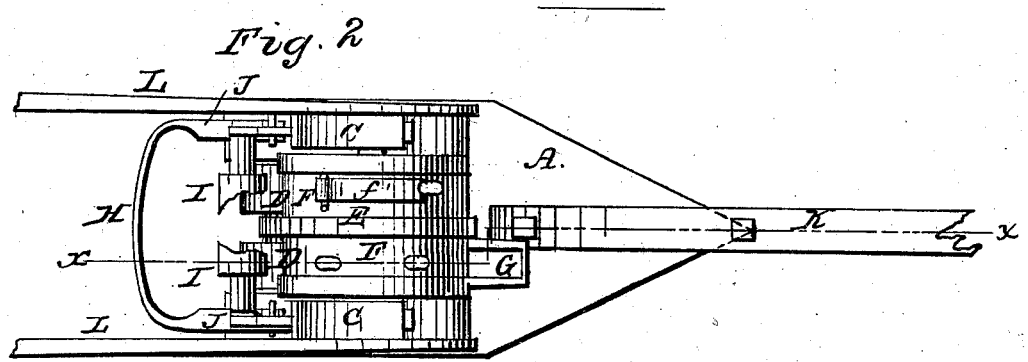
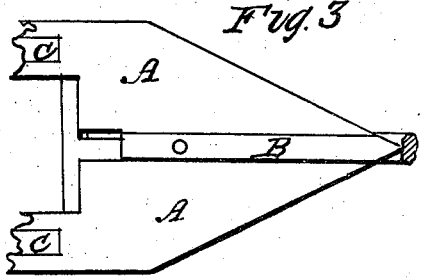
Witnesses
Alex F. Roberts
Geo. W. Mabee
Inventor
Mathew McMillian
by Munn & Co
Attorneys

United States Patent Office.

MATTHEW McMILLIAN, OF CANEY, ARKANSAS.

Letters Patent No. 97,424, dated November 30, 1869.

IMPROVEMENT IN COTTON-SEED PLANTERS.

The Schedule referred to in these Letters Patent and making part of the same.

To all whom it may concern:

Be it known that I, MATTHEW McMILLIAN, of Caney, in the county of Ouachita, and State of Arkansas, have invented a new and improved Cotton-Seed Planter; and I do hereby declare that the following is a full, clear, and exact description thereof, which will enable others skilled in the art to make and use the same, reference being had to the accompanying drawing, forming part of this specification.

Figure 1 is a detail longitudinal section of my improved cotton-seed planter, taken through the line $x\, x$, fig. 2.

Figure 2 is a top view of the same, part being broken away to show the construction.

Figure 3 is a detail under-side view of the forward part of the planter.

Similar letters of reference indicate corresponding parts.

My invention has for its object to furnish a simple, convenient, and effective cotton-seed planter, which shall be so constructed and arranged as to plant the seed in a narrow channel, making it much more convenient for scraping, chopping, and, in fact, for the entire process of cultivation; and It consists in the construction and combination of the various parts of the machine, as hereinafter more fully described.

A is the base-block, which is made of convenient size, and of a thickness sufficient to give the necessary weight. The side edges of the block A are bevelled off from about their centres to their forward ends, as shown in figs. 2 and 3.

B is the opener, which is a bar of iron or steel, made somewhat V-shaped in its cross-section, and which is securely bolted to the under side of the forward part of the block A. The forward part of the opener B is bevelled off, as shown in fig. 3, to serve as a coulter for opening the soil, to receive the seed, and which also serves to cut off small roots, and enables the machine to rise over large roots and other obstructions. The rear end of the block A is recessed, as shown in the drawings.

To the rear part of the block A, upon each side of the said recess, are attached the lower ends of the standards or uprights C.

D is a roller, which is pivoted to the recessed block A, or to the lower parts of the standards C, and the middle part of which is deeply grooved to receive the belt E, by means of which the dropping-device is operated so as to prevent said belt from becoming clogged, the said roller being so pivoted as to bear upon and receive motion from contact with the ground.

F is the dropping-cylinder, which is pivoted to and between the upper ends of the standards C. The cylinder F is made hollow, to receive the cotton-seed, which is inserted through a hole in the side of said cylinder, near one end, which opening is covered with a cap, $f'$, as shown in figs. 1 and 2.

In the side of the cylinder F, near its other end, is formed a series of six, more or less, discharge-openings, equally distant from each other, through which, as the said cylinder is revolved, the seed escapes and falls into the spout G, by which it is conducted into the narrow channel formed by the opener B in the rear of said opener, and in front of the groove of the roller D, which has a tendency to press in the sides of said channel, partially covering the seed.

The covering of the seed is completed by the coverer H, the ends of the arms of which are pivoted to the rear parts of the block A, in such a way that said coverer can drop down only so far, but can rise freely to pass over obstructions. The lower edge of the coverer H is concaved, so as to round up the soil over the covered seed.

By this construction of the machine, the seed will be planted in a narrow drill, making the plants much more convenient for scraping, chopping, and the other operations of cultivating them, than when planted in straggling or scattered rows in the ordinary manner.

I is a roller pivoted to eye-bolts J, adjustably attached to the standards C, in such positions that the roller I may bear against the belt E, to tighten it as required.

The planter is provided with a tongue, K, and handles L, in the ordinary manner.

Having thus described my invention,

I claim as new, and desire to secure by Letters Patent—

An improved cotton-seed planter, formed by the combination of the block A, opener B, grooved roller D, band E, dropping-cylinder F, spout G, and coverer H, with each other, said parts being constructed, arranged, and operating substantially as herein shown and described, and for the purpose set forth.

MATTHEW McMILLIAN.

Witnesses:
JOHN GULLEY,
A. B. MOODY.